Feb. 18, 1958   E. TRAUMÜLLER   2,823,485
FISHHOOKS
Filed March 27, 1956
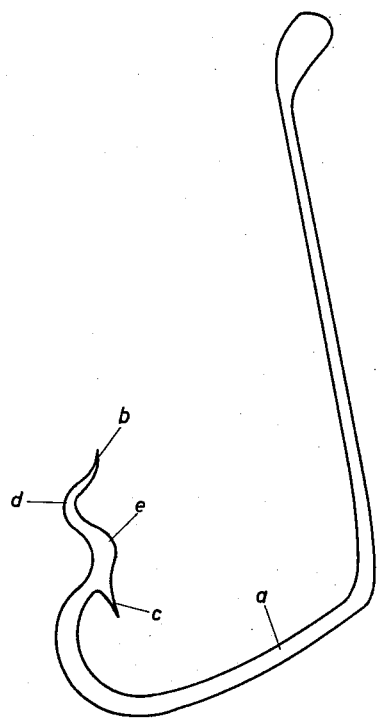
Inventor
Erhard Traumüller
By Ralph B. Stewart
Attorney

United States Patent Office 2,823,485
Patented Feb. 18, 1958

2,823,485

FISHHOOKS

Erhard Traumüller, Schwabach, Germany

Application March 27, 1956, Serial No. 574,163

5 Claims. (Cl. 43—43.16)

The invention relates to a fishhook which is provided with a barb. The ordinary fishhook having a beard or barb behind the point is open to several objections. When small fishes bite, the barb also in their case, penetrates the mouth with the detrimental result that in removing the hook the fishes are mostly badly injured and subsequently die so that they cannot be thrown back into the water. In addition, the bait easily slips off the hook so that, after a relatively short period of time, this becomes exposed and must be baited anew.

It has been proposed to construct fishhooks so that the point is followed by a cam-like structure which makes it possible to catch and remove small fishes without seriously damaging them. These fishhooks are, however, unsuitable for large fish because such a hook easily disengages if the fish makes sudden movements.

Therefore the object of the invention is to produce a fishhook which is suitable for catching both small and also large fish without seriously injuring them, but which reliably holds large fish.

This object can be attained according to the invention by providing between the point and the barb of the hook at least two oppositely directed bulges. This suggestion is preferably realized by making the fishhook undulated or wavy between the point and the barb.

A fishhook of this construction represents an important advance in the art of angling. When a fisherman strikes after a fish has bitten, the point of the hook and the first bulge following thereon offer sufficient resistance, if a small fish is hooked, to land the fish from the place he is standing. In so doing, the hook does not penetrate more deeply. He can, therefore, remove small fishes from the hook without difficulty and without seriously injuring them. In the case of a larger but still undersized fish the hook, under the same striking force, penetrates to a slightly deeper depth. The second bulge is reached, but not the barb. Only in the case of fishes of relatively heavy weight is the barb driven into the mouth of the fish under the same lifting force exerted when striking. Consequently it is possible with a hook constructed according to the invention to achieve that, when landing a small fish, as only the point and the first bulge enter the mouth, the living fish can be removed from the hook and thrown back into the water, whereas a large fish can be safely landed, because, under its weight, the barb becomes operative. Moreover, due to the undulated shape of the hook, the barb holds more securely than heretofore. Smaller bait than was hitherto required can be used because it is not damaged as much as was hitherto the case when being put on the hook.

An embodiment of the invention is illustrated diagrammatically by way of example in the only figure of the accompanying drawing.

The fishhook $a$ has between its point $b$ and the barb $c$ two bulges $d$ and $e$ projecting in opposite directions. The hooks may be stamped. However, the bulges $d$ and $e$ are preferably formed by making the fishhook in wavy or undulated shape between the point $b$ and the barb $c$.

The two bulges or undulations $d$ and $e$ may be the same length and height. But it is recommended that, as in the example illustrated, the bulge forming the wave $e$ be made longer and/or higher than that forming the wave $d$. In this manner the resistance to penetration offered by the bulge $e$ is greater than that of the bulge $d$.

Further modifications are possible in that more than two bulges or waves can be provided. The barb $c$ may also be arranged on the outer side of the hook instead of on the inner side thereof.

I claim:

1. A fishhook, comprising a point at the end of said hook, a barb spaced from said point, and at least two oppositely directed bulges in the hook section between the point and the barb.

2. Fishhook as set forth in claim 1, wherein the section between the point and the barb is undulated in shape.

3. Fishhook as set forth in claim 1, wherein the section between the point and the barb is undulated in shape and the individual undulations are progressively longer towards the barb.

4. Fishhook as set forth in claim 1, wherein the section between the point and the barb is undulated in shape and the individual undulations are progressively higher towards the barb.

5. Fishhook as set forth in claim 1, wherein the section between the point and the barb is undulated in shape and the individual undulations are progressively longer and higher towards the barb.

References Cited in the file of this patent

UNITED STATES PATENTS

| | | |
|---|---|---|
| 627,179 | Dreese | June 20, 1899 |
| 779,843 | Fredricks | Jan. 10, 1905 |
| 1,502,781 | Jamison | Oct. 16, 1924 |